(12) United States Patent
Campbell et al.

(10) Patent No.: US 8,912,951 B2
(45) Date of Patent: Dec. 16, 2014

(54) MOVING TARGET DETECTION USING A TWO-DIMENSIONAL FOLDING APPROACH

(71) Applicant: Raytheon Company, Waltham, MA (US)

(72) Inventors: Timothy Campbell, El Segundo, CA (US); Theagenis J. Abatzoglou, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 206 days.

(21) Appl. No.: 13/648,091

(22) Filed: Oct. 9, 2012

(65) Prior Publication Data

US 2014/0097980 A1    Apr. 10, 2014

(51) Int. Cl.
  *G01S 13/00*   (2006.01)
  *G01S 13/52*   (2006.01)
  *G01S 7/292*   (2006.01)

(52) U.S. Cl.
  CPC ..................... *G01S 7/292* (2013.01)
  USPC ........... 342/160; 342/159; 342/162; 342/175; 342/195

(58) Field of Classification Search
  CPC ....................................... G01S 7/292
  USPC .......................... 342/159–164, 175, 194–197
  See application file for complete search history.

(56) References Cited

U.S. PATENT DOCUMENTS

| | | | |
|---|---|---|---|
| 6,275,808 B1 | 8/2001 | DeMarcken | |
| 7,212,149 B2 * | 5/2007 | Abatzoglou et al. | 342/25 F |
| 7,289,060 B1 * | 10/2007 | Abatzoglou et al. | 342/90 |
| 7,436,911 B2 * | 10/2008 | Fudge et al. | 375/340 |
| 7,436,912 B2 * | 10/2008 | Fudge et al. | 375/340 |
| 7,532,150 B1 * | 5/2009 | Abatzoglou et al. | 342/25 F |
| 7,969,345 B2 * | 6/2011 | Abatzoglou et al. | 342/25 R |
| 8,078,130 B2 * | 12/2011 | Fudge et al. | 455/295 |
| 8,081,946 B2 * | 12/2011 | Fudge | 455/295 |
| 8,149,894 B2 * | 4/2012 | Fudge | 375/133 |
| 8,184,673 B2 * | 5/2012 | Fudge | 375/136 |
| 8,237,605 B2 * | 8/2012 | Abatzoglou | 342/28 |
| 8,249,129 B2 * | 8/2012 | Fudge | 375/135 |

(Continued)

OTHER PUBLICATIONS

"Tensor Algebra and Multidimensional Harmonic Retrieval in Signal Processing for MIMO Radar", Dimitri Nion, Sidiropolous, Nicholas D., IEEE Transactions on Signal Processing, vol. 58, No. 11, Nov. 2010, pp. 5693-5705.*

(Continued)

*Primary Examiner* — Peter Bythrow
(74) *Attorney, Agent, or Firm* — Christie, Parker & Hale, LLP (57) ABSTRACT

A system and method for discrimination and identification of a target including: receiving a radar return signal including target information and clutter information; determining a two-fold forward or forward-backward data matrix from the received signal, using a multi-dimensional folding (MDF) process; computing singular values of the two-fold forward or forward-backward data matrix; using the computed singular values to determine a noise power level of the radar return signal; determining the number of scatterers in the radar return signal according to a predetermined threshold value above the noise power; estimating complex Doppler and azimuth frequencies of each scatterer from the determined number of scatterers using the MDF process; determining dispersive scatterers and non-dispersive scatterers using the estimated Doppler and azimuth complex frequencies of each scatterer; and distinguishing the target information from the clutter information, according to the determined dispersive scatterers and non-dispersive scatterers.

18 Claims, 3 Drawing Sheets

(56) References Cited

U.S. PATENT DOCUMENTS

| | | | |
|---|---|---|---|
| 8,401,050 B1 * | 3/2013 | Fudge et al. | 375/130 |
| 8,509,354 B2 * | 8/2013 | Fudge et al. | 375/324 |
| 8,509,368 B2 * | 8/2013 | Fudge et al. | 375/371 |
| 2006/0193371 A1 * | 8/2006 | Maravic | 375/130 |
| 2007/0081578 A1 * | 4/2007 | Fudge et al. | 375/130 |
| 2007/0086544 A1 * | 4/2007 | Fudge et al. | 375/316 |
| 2010/0002777 A1 * | 1/2010 | Boyle et al. | 375/242 |
| 2014/0097980 A1 * | 4/2014 | Campbell et al. | 342/90 |

OTHER PUBLICATIONS

"Subspace techniques for multidimensional model order selection in colored noise", Kefei Liu, da Costa, Joao Paulo C.L., So, Hing Cheung, Huang, Lei, Signal Processing 93 (2013) pp. 1976-1987.*

"Sequence Folding, Lattice Tiling, and Multidimensional Coding", Tuvi Etzion, IEEE Information Theory Workshop, Taormina, Sicily, Italy, Oct. 2009, pp. 1-21.*

Liu, Xiangqian et al; "On Constant Modulus Multidimensional Harmonic Retrieval"; IEEE; Sep. 2002; pp. 2977-2980.

* cited by examiner

MOVING TARGET DETECTION USING A TWO-DIMENSIONAL FOLDING APPROACH

FIELD OF THE INVENTION

The present invention relates to a system and method for moving target detection using a 2-D multi-dimensional folding approach.

BACKGROUND

While trying to detect dismounts and other slow-moving targets, a radar platform, such as a ground moving target indication (GMTI) radar minimum detectable velocity, is limited by the radar dwell duration azimuth-Doppler extent of the clutter. The problem is exacerbated by factors such as short duration dwells, wind-blown ground clutter, rain clutter, and bird-flock clutter and radio frequency interference (RFI). It can be difficult to separate target from clutter returns when the clutter is spread in Doppler, in which target and clutter returns overlap in Doppler. The clutter (and other non-target signals) can be Doppler spread due to factors such as: radar platform motion; the nature of the clutter, such as whether it is wind blow, rain, bird flock, sea, etc.; or other factors such as miscalibration and RFI. The target trackers or clutter maps can be overwhelmed by a very large number of clutter-hit detections (especially in air-to-ground modes). Furthermore, for a slow radial velocity target, it becomes increasingly difficult to distinguish the target from the non-stationary clutter radar return signal.

A traditional technique to detect endo-clutter targets is Space-Time Adaptive Processing (STAP). The STAP technique combines adaptive beamforming and adaptive Doppler filtering into a single 2-D algorithm to yield 2-D detection weights for a target at each candidate azimuth and Doppler. A primary disadvantage of this method is that determination of adaptive weights requires stationary interference and training data that adequately captures the space-time correlation of such interference. Performance of STAP may be deleteriously impacted by signal interference that is difficult to train on, such as non-stationary clutter and terrain bounced interference. Furthermore, the STAP method requires large number of radar return snapshots for training.

SUMMARY

In some embodiments, the present invention is a computer implemented method for discrimination and identification of a target. The method is executed by one or more processors including the appropriate firmware and software. The method includes: receiving a radar return signal including target information and clutter information; determining a two-fold forward or forward-backward data matrix from the received signal, using a multi-dimensional folding (MDF) process; computing singular values of the two-fold forward or forward-backward data matrix; using the computed singular values to determine a noise power level of the radar return signal; determining the number of scatterers in the radar return signal according to a predetermined threshold value above the noise power; estimating Doppler and azimuth frequencies of each scatterer from the determined number of scatterers using the MDF process; determining dispersive scatterers and non-dispersive scatterers using the estimated Doppler and azimuth complex frequencies of each scatterer; and distinguishing the target information from the clutter information, according to the determined dispersive scatterers and non-dispersive scatterers.

In some embodiments, the present invention is a system for discrimination and identification of a target. The system includes a receiver for receiving a radar return signal including target information and clutter information; a storage medium for storing the radar return signal; and one or more processors configured to determine a two-fold forward or forward-backward data matrix from the received signal, using a MDF process; compute singular values of the two-fold forward or forward-backward data matrix; using the computed singular values determine a noise power level of the radar return signal; determine the number of scatterers in the radar return signal according to a predetermined threshold value above the noise power; estimate Doppler and azimuth frequencies of each scatterer from the determined number of scatterers using the MDF process; determine dispersive scatterers and non-dispersive scatterers using the estimated Doppler and azimuth complex frequencies of each scatterer; and distinguish the target information from the clutter information, according to the determined dispersive scatterers and non-dispersive scatterers.

In some embodiments, the dispersive scatterers and non-dispersive scatterers are determined by using a maximum likelihood for dispersion/non-dispersion in two dimensions. A dispersive scatterer may be considered as a clutter or interference and a non-dispersive scatterer is considered as the target and the dispersive scatterers may be deleted from the radar return signal to obtain a cleansed radar return signal.

BRIEF DESCRIPTION OF THE DRAWINGS

The accompanying drawings, together with the specification, illustrate exemplary embodiments of the present invention and, together with the description, serve to explain aspects and principles of the present invention.

DETAILED DESCRIPTION

In general, the principle of discriminating between dispersive and non-dispersive signals applies to a wide variety of transmitted radar waveforms, dwell durations, waveform bandwidths, etc. As a non-limiting example, certain monitoring and tracking applications require the detection of dismounts and other slow-moving targets in the presence of various types of clutter while using short dwell durations. The method is also applicable to detecting targets moving at regular speed. Short dwell durations, which can be 25-30 milliseconds (msec), limit resolution because of the short dwell. Longer dwell durations, on the other hand, such as longer than 30 msec, can lead to decorrelation of certain targets like the dismount Doppler returns (which allows separation of different body parts). The relatively short dwell durations can limit comparable Doppler filter resolution in the presence of significant ground clutter to around 0.9 meters per second (m/sec). This can also make it difficult to discern dismount leg and arm return signals, which can exhibit Doppler velocities between 0 and 3 m/sec. Other targets of interest include moving vehicles and boats.

Embodiments of the present invention are directed to discriminating between the dispersive and non-dispersive signals in, for instance, radar return signals. In some embodiments, the present invention applies and augments a Multi-Dimensional Folding (MDF) method developed for multi-dimensional harmonic retrieval to detect and extract moving targets with high accuracy. This method helps in detecting moving targets and separating them from ground-clutter, wind-blown clutter, rain clutter, bird-flock clutter, sea clutter, RFI and the like while providing higher resolution than other methods.

In some embodiments, the system and method of the present invention performs simultaneous 2-D estimation of Doppler and Azimuth of moving targets with near maximum likelihood accuracy in the presence of ground clutter and interference. This approach enhances the MDF technique with a novel method for extracting scatterers' Doppler and Azimuth Automatic model order estimator for the number of stutterers present in the radar returns, based on a 2-fold forward or forward-backward data matrix singular value decomposition. This technique is superior to approaches that rely on ground clutter spread to eliminate false detections but have no provisions for sea clutter, rain clutter, or flocks of birds to be eliminated based on factors such as their dispersiveness.

Further embodiments provide a method to discriminate between dispersive clutter-like returns and non-dispersive target-like scatterers. This method can be applied to a wide variety of radar signal waveforms, waveform bandwidths, and dwell durations. The method is based on simultaneous 2-D estimation of complex Doppler and Azimuth frequency of moving targets with near maximum likelihood accuracy in the presence of ground clutter and interference. It can be also used to equally provide high resolution SAR images of targets.

Figure 1:
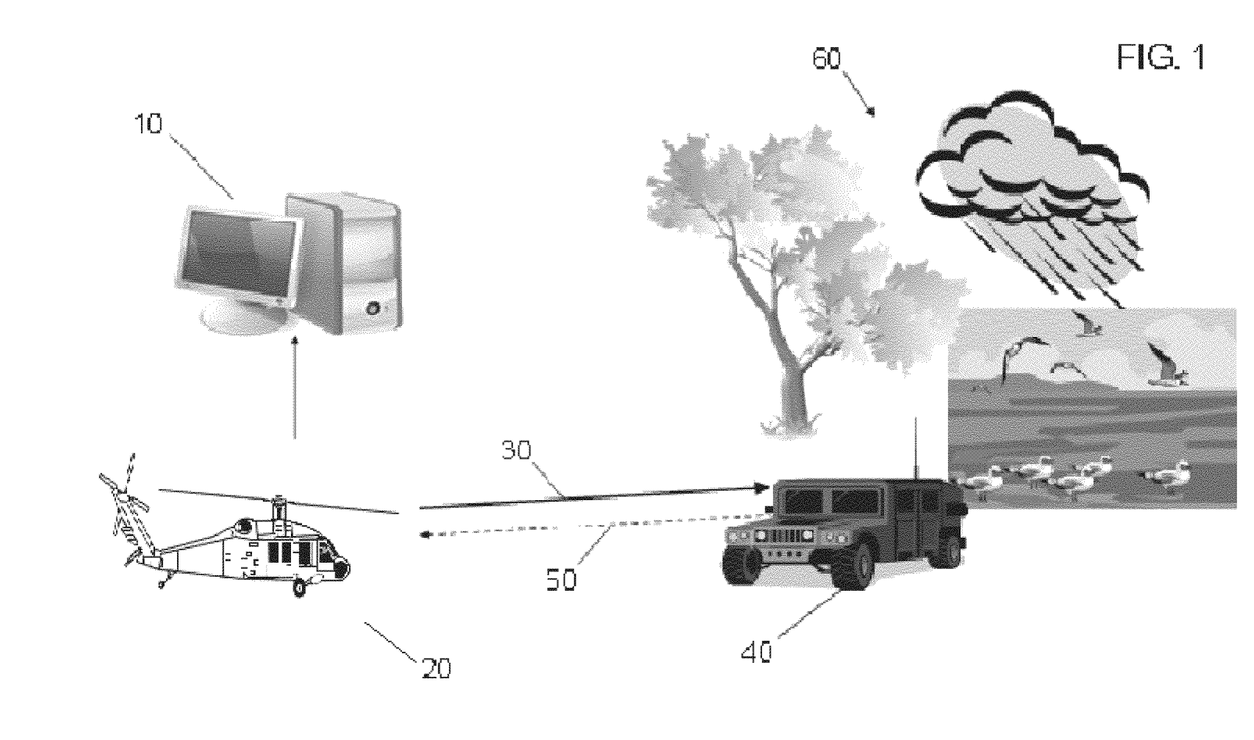
FIG. 1 illustrates an exemplary system, including signal processing algorithms for discriminating between dispersive and non-dispersive scatterers, according to an embodiment of the present invention.

FIG. 1 illustrates an exemplary system 10, including a signal processor or computer having a processor or central processing unit (CPU), a storage device (such as a disk drive or solid state memory) for storing instruction code (computer-readable instructions and data (such as radar signals), the instruction code including signal processing algorithms for discriminating between dispersive and non-dispersive scatterers, according to an embodiment of the present invention. As shown, radar 20 (for example, a vehicle-mounted Doppler pulse radar) sends out signals (pulses) 30, which reflect off various scatterers such as a vehicle 40 and are returned as (much weaker) Doppler-shifted (and usually non-dispersive) signals 50 to the radar 20. The radar scans a portion of the surroundings, a particular target (such as the vehicle 40) staying in the radar's signal beam for a particular dwell time, during which a corresponding number of pulses are transmitted to, back-scattered off, and received from the target. In addition, still other (usually dispersive) signals back-scatter off of other scatterers such as various clutter 60 (including ground clutter such as trees, weather clutter such as rain, birds, or sea clutter). The radar 20 receives the return signals 50 and sends them to the system 10 for processing by the CPU using the signal processing algorithms for discriminating between dispersive and non-dispersive scatterers. It also has better resolution capability in separating scatterers in Doppler-azimuth or Range-Doppler.

As described above, the radar return signals include the desired (non-dispersive) target signals 50 and the undesired (dispersive) clutter signals 60 along with noise (such as thermal noise and/or other interferences). The radar signals can be processed into various scattering modes (representing different resonances). The goal is to discriminate between the target non-dispersive scatterers and the clutter (plus thermal noise and/or other interferences, such as radio frequency interference (RFI)), which can also produce scattering modes.

The signal processing methods for discriminating between dispersive and non-dispersive scatterers detect characteristics of the complex Azimuth-Doppler, such as those from the vehicle 40. These target signatures differ from the Doppler spectral signatures of various clutter, such as ground clutter (for example, wind blown or stationary), sea clutter, weather clutter, and "angel" clutter (e.g., birds). Using a dispersive (i.e., clutter-like) versus a non-dispersive target-like) approach (described in more detail below), the signal processing algorithms for discriminating between dispersive and non-dispersive scatterers separates the target 40 from the various clutter 60.

Figure 2:
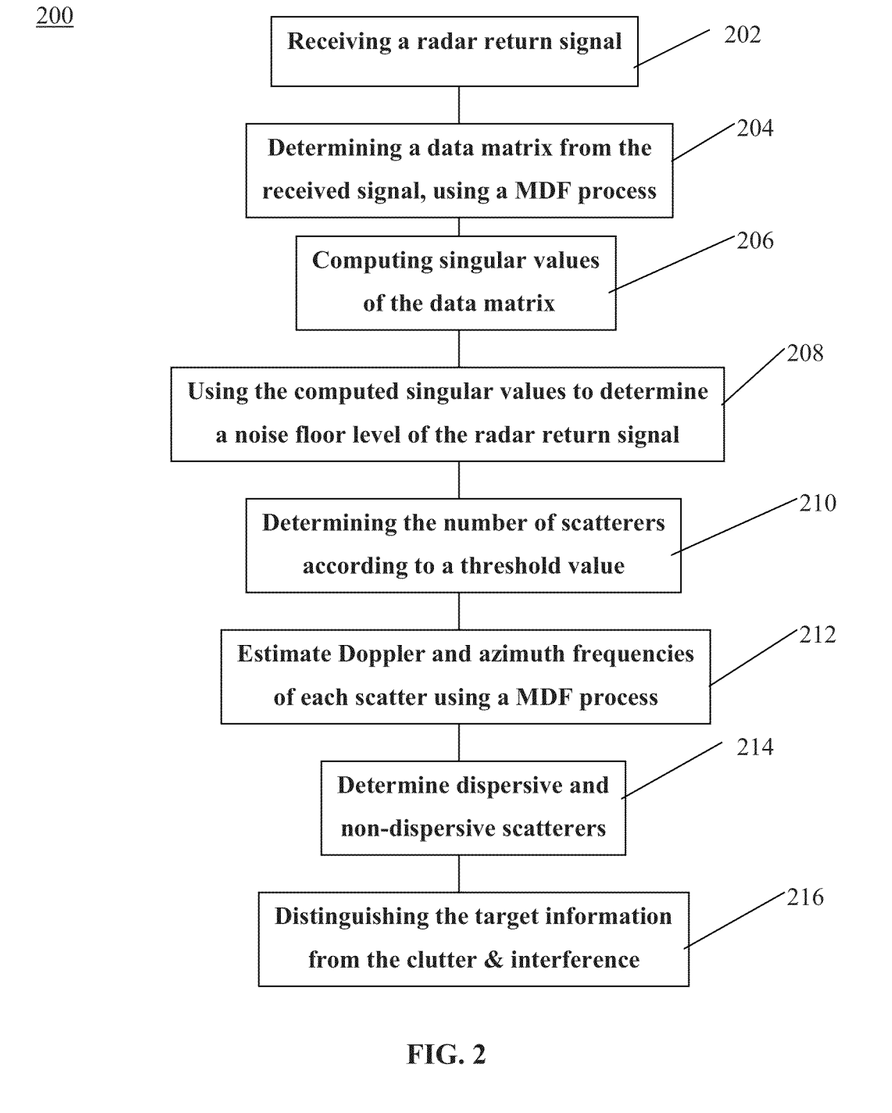
FIG. 2 is a process flow diagram of an exemplary method 200 for target discrimination using a 2-D multi-dimensional folding, according to some embodiments of the present invention.

FIG. 2 is a process flow diagram of an exemplary method 200 for target detection using a 2-D multi-dimensional folding, according to some embodiments of the present invention. As shown in block 202, a radar return signal including target information, clutter information and possibly interference information is received by one or more antennas and input to a processor, typically after some signal shaping. In block 204, the processor then determines a two-fold forward or forward-backward data matrix from the received signal, using a MDF process, described in more detail below. Singular values of the data matrix are then computed, according to known methods in the art, in block 206. In block 208, the invention utilizes the computed singular values to determine a noise power level of the radar return signal by averaging the square of the middle third of the values, because the MDF technique requires in advance an estimate of the scattering modes present in the data samples.

Referring back to FIG. 2, the invention determines the number of scatterers in the radar return signal according to a predetermined threshold value above the noise power, in block 210. For example, the invention keeps scatterers with corresponding value of 12 dB above the noise power level and disregards the scatterers below such 12 dB value. The predetermined threshold value may be set at the system level. In some embodiments, the predetermined threshold value may be dynamically changed depending on the environmental and weather conditions. For example, in a terrain with a substantial number of trees and obstacles, or a cloudy weather, the predetermined threshold value may be set a higher value than in a terrain with not many obstacles.

The invention then uses the MDF process and the determined number of scatterers to estimate Doppler and azimuth frequencies of each scatter, in block 212. In block 214, the processor of the present invention then determines dispersive scatterers and non-dispersive scatterers by using, for example, a maximum likelihood for dispersion/non-dispersion in two dimensions (ML2D) process (described below) with the estimated Doppler and azimuth frequencies of each scatterer. Once the dispersive scatterers and non-dispersive scatterers are determined, the invention distinguishes the non-dispersive scatterers as target and the dispersive scatterers as clutter and/or interference, in block 216.

Figure 3:
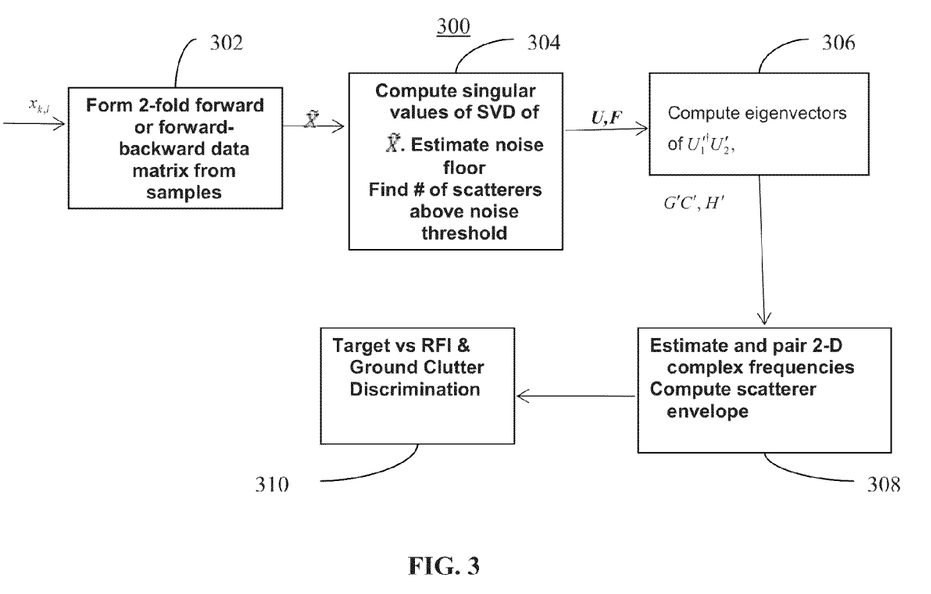
FIG. 3 is a process flow diagram of an exemplary method 200 for target discrimination using a 2-D multi-dimensional folding, according to some embodiments of the present invention.

FIG. 3 is a process flow diagram of an exemplary method 300 for target discrimination using a 2-D multi-dimensional folding, according to some embodiments of the present invention. As shown in block 302, a 2-fold forward or forward-backward data matrix $\tilde{X}$ is formed from samples $X_{k,i}$, using a MDF process. The samples are obtained from the radar return signal using conventional methods. In block 304, singular values of the data matrix are then computed, according to known methods in the art. For example:

$\tilde{X}=U\Sigma V^*$; where U is the left singular unitary matrix, $\Sigma$ is the diagonal matrix of singular values and V is the right singular unitary matrix.

A noise power level of the radar return signal is then calculated, for example, from the average of the middle third of the square of the singular values of the data matrix. Also, the number of scatterers above the noise power level F is determined. The data matrix U and the number of scatterers above the noise power level F are then input to block 306.

In block 306, the eigenvectors of $U'_1 U'_2$ are computed as G'C', H', and GC & H are computed from U.

The eigenvectors G'C', H' are input to block 308, wherein the 2-D complex frequencies are estimated and paired. Then, an envelope for the scatterers is computed. Finally, the target is discriminated from the clutter and/or RFI, in block 310.

The superposition of F number of 2D sinusoids can be represented by:

$$x_{k,l} = \sum_{f=1}^{F} c_f a_f^{k-1} b_f^{l-1}; k = 1, \ldots, K, l = 1, \ldots, L \text{ where,}$$

$c_f$=complex envelope of $f^{th}$ 2D sinusoid
$a_f = e^{2\pi j \mu_f}$: decaying sinusoidal phasor along dimension 1,
$\mu_f \equiv \mu_{Rf} + j\mu_{If}$
$b_f = e^{2\pi j \nu_f}$: decaying sinusoidal phasor along dimension 2,
$\nu_f \equiv \nu_{Rf} + j\nu_{If}$ $$x_{k,l} = \sum_{f=1}^{F} c_f e^{2\pi j \mu_f (k-1)} e^{2\pi j \nu_f (l-1)};$$

Then, the data matrix X:

$$X = \{x_{k,l}\}_{k,l} = \begin{bmatrix} x_{1,1} & x_{1,2} & \ldots & x_{1,L} \\ x_{2,1} & x_{2,2} & \ldots & x_{2,L} \\ \vdots & \vdots & \ldots & \vdots \\ x_{K,1} & x_{K,2} & \ldots & x_{K,L} \end{bmatrix}; \text{ then}$$

It is noted that $\mu_f$ and $\nu_f$ are complex frequencies, which include a real component and an imaginary component. Data matrix X can be decomposed in terms of the Frequency Steering Matrices: A, B, where C is complex Envelope Diagonal Matrix $$A = \{A_{k,f}\}_{k,f} = \{e^{2\pi j \mu_f (k-1)}\}_{k,f}$$
$$B = \{B_{l,f}\}_{l,f} = \{e^{2\pi j \nu_f (l-1)}\}_{l,f}$$
$$C = \text{diag}(c_1 \ldots c_F)$$
$$X = ACB^T$$

$$A = \begin{bmatrix} 1 & 1 & \ldots & 1 \\ e^{2\pi j \mu_1} & e^{2\pi j \mu_2} & \ldots & e^{2\pi j \mu_F} \\ \vdots & \vdots & \vdots & \vdots \\ e^{2\pi j (K-1)\mu_1} & e^{2\pi j (K-1)\mu_2} & \ldots & e^{2\pi j (K-1)\mu_F} \end{bmatrix};$$

-continued $$B = \begin{bmatrix} 1 & 1 & \ldots & 1 \\ e^{2\pi j \nu_1} & e^{2\pi j \nu_2} & \ldots & e^{2\pi j \nu_F} \\ \vdots & \vdots & \vdots & \vdots \\ e^{2\pi j (L-1)\nu_1} & e^{2\pi j (L-1)\nu_2} & \ldots & e^{2\pi j (L-1)\nu_F} \end{bmatrix}$$

Define 4—way array $\hat{X}$ with typical elements $$\hat{x}_{k_1,k_2,l_1,l_2} \equiv x_{k_1+k_2-1,l_1+l_2-1} =$$

$$\sum_{f=1}^{F} c_f e^{2\pi j \mu_f (k_1-1)} e^{2\pi j \mu_f (k_2-1)} e^{2\pi j \nu_f (l_1-1)} e^{2\pi j \nu_f (l_2-1)}$$

$$k_i = 1, \ldots, K_i \geq 2 (i=1, 2); \quad l_i = 1, \ldots, L_i \geq 2 (i=1, 2)$$

For i=1, 2 define matrices $$A_i = \{e^{2\pi j \mu_f (k_1-1)}\}_{k,f} \in C^{K_i \times F} \; (K_i \times F \text{ complex matrix})$$

$$B_i = \{e^{2\pi j \nu_f (l_i-1)}\}_{l_i,f} \in C^{L_i \times F} \; (L_i \times F \text{ complex matrix})$$

Now, the forward data matrix $\tilde{X}$ may be formed as:

Nest the 4-way array $\hat{X}$ into a matrix: $\tilde{X} \in C^{K_1 L_1 \times K_2 L_2}$
by collapsing 2 pairs of dimensions such that $$\tilde{x}_{p,q} = \hat{x}_{\lceil \frac{p}{L_1} \rceil, \lceil \frac{q}{L_2} \rceil, p-(\lceil \frac{p}{L_1} \rceil -1)L_1, q-(\lceil \frac{q}{L_2} \rceil -1)L_2} =$$

$$x_{\lceil \frac{p}{L_1} \rceil + \lceil \frac{q}{L_2} \rceil -1, p-(\lceil \frac{p}{L_1} \rceil -1)L_1 + q-(\lceil \frac{q}{L_2} \rceil -1)L_2 -1} = \sum_{f=1}^{F} c_f g_{p,f} h_{q,f}$$

where $$g_{p,f} = e^{2\pi j \mu_f (\lceil \frac{p}{L_1} \rceil -1)} e^{2\pi j \nu_f (p-(\lceil \frac{p}{L_1} \rceil -1)L_1 -1)}$$

$$h_{q,f} = e^{2\pi j \mu_f (\lceil \frac{q}{L_2} \rceil -1)} e^{2\pi j \nu_f (q-(\lceil \frac{q}{L_2} \rceil -1)L_2 -1)}$$

$$p = 1, \ldots, K_1 L_1, \quad q = 1, \ldots, K_2 L_2$$

Define $$G = \{g_{p,f}\}_{p,f} \in C^{K_1 L_1 \times F}$$

$$H = \{h_{q,f}\}_{q,f} \in C^{K_2 L_2 \times F}$$

It can be verified that $G = A_1 \otimes B_1$; $H = A_2 \otimes B_2$; ($\otimes$ is the tensor product of columns)

this now implies that $$\tilde{X} = GCH^T$$

Where, for example, G is defined as follows.

$$G = \begin{bmatrix} 1 & 1 & \cdots & 1 \\ e^{2\pi j v_1} & e^{2\pi j v_2} & \cdots & e^{2\pi j v_F} \\ \vdots & \vdots & \cdots & \vdots \\ e^{2\pi j(L_1-1)v_1} & e^{2\pi j(L_1-1)v_2} & \cdots & e^{2\pi j(L_1-1)v_F} \\ e^{2\pi j \mu_1} & e^{2\pi j \mu_2} & \cdots & e^{2\pi j \mu_F} \\ e^{2\pi j \mu_1} e^{2\pi j v_1} & e^{2\pi j \mu_2} e^{2\pi j v_2} & \cdots & e^{2\pi j \mu_F} e^{2\pi j v_F} \\ \vdots & \vdots & \vdots & \vdots \\ e^{2\pi j \mu_1} e^{2\pi j(L_1-1)v_1} & e^{2\pi j \mu_2} e^{2\pi j(L_1-1)v_2} & \cdots & e^{2\pi j \mu_F} e^{2\pi j(L_1-1)v_F} \\ \vdots & \vdots & \cdots & \vdots \\ e^{2\pi j(K_1-1)\mu_1} & e^{2\pi j(K_1-1)\mu_2} & \cdots & e^{2\pi j(K_1-1)\mu_F} \\ e^{2\pi j(K_1-1)\mu_1} e^{2\pi j v_1} & e^{2\pi j(K_1-1)\mu_2} e^{2\pi j v_2} & \cdots & e^{2\pi j(K_1-1)\mu_F} e^{2\pi j v_F} \\ \vdots & \vdots & \cdots & \vdots \\ e^{2\pi j(K_1-1)\mu_1} e^{2\pi j(L_1-1)v_1} & e^{2\pi j(K_1-1)\mu_2} e^{2\pi j(L_1-1)v_2} & \cdots & e^{2\pi j(K_1-1)\mu_F} e^{2\pi j(L_1-1)v_F} \end{bmatrix} = A_1 \otimes B_1$$

Analogous decomposition is also applicable to H, where the second frequency component of the 2-D sinusoids is used. Define $$y_{k,l} \equiv x^*_{K-k+1, L-l+1} = \sum_{f=1}^{F} \tilde{c}_f e^{2\pi j \mu_f (k-1)} e^{2\pi j v_f (l-1)};$$

$$k = 1, \ldots, K; l = 1, \ldots, L$$

$$Y = \{y_{k,l}\}_{k,l} \in C^{K \times L}$$

Conjugation and folding of the lower—left quadrant leads to another set of 2D sinusoids: same frequencies but different coefficients. Thus Can construct matrix $\tilde{Y} \in C^{K_1 L_1 \times K_2 L_2}$ from Y such that $$\tilde{y}_{p,q} = \sum_{f=1}^{F} \tilde{c}_f g_{p,f} h_{q,f} \Rightarrow \tilde{Y} = G \tilde{C} H^T$$

$$\tilde{C} = \text{diag}(\tilde{c}_1, \ldots, \tilde{c}_F)$$

where $\tilde{Y}$ is the backward data matrix,
Assuming: $K_1 L_1 \geq F$ & $K_2 L_2 \geq F$
G & H are full rank $\Rightarrow \tilde{X}$ & $\tilde{Y}$ are full column rank
Singular Value Decomposition of the stacked data yields $$\begin{bmatrix} \tilde{X} \\ \tilde{Y} \end{bmatrix} = \begin{bmatrix} GC \\ G\tilde{C} \end{bmatrix} H^T = U_{2K_1 L_1 \times F} \Sigma_{F \times F} V^*_{K_2 L_2 \times F}$$

U has F columns which together span the column space of: $[\tilde{X}^T \tilde{Y}^T]^T$
Same space is spanned by the columns of: $[(GC)^T (G\tilde{C})^T]^T$
$\Rightarrow \exists$ non-singular $F \times F$ matrix T $\ni$ $$U = \begin{bmatrix} U_1 \\ U_2 \end{bmatrix} = \begin{bmatrix} GC \\ G\tilde{C} \end{bmatrix} T$$

$\Rightarrow U_1^\dagger U_2 = T^{-1} C^{-1} \tilde{C} T$ (Eigenvalue Decomposition problem)
$T^{-1}$ contains the eigenvectors of $U_1^\dagger U_2$ (scaled to unit norm)
Key parameters are given by $$GC = U_1 T^{-1}, H = [(GC)^\dagger \tilde{X}]^T$$

Here the forward data matrix $\tilde{X}$ is appended with backward data matrix $\tilde{Y}$. $\Sigma$ is a diagonal matrix with sinusoid values in descending order.

To extract the number of scatterers, the 2-D frequency components and complex amplitudes are computed by one or more processors as follows:
It can be shown that the first row of GC is the diagonal of C, i.e., $[c_1, \ldots, c_F]$.
$(\mu_f, v_f)$ can be recovered from G and/or H, i.e.,
the $2^{nd}$ and $(L_2+1)^{th}$ rows of H are: $[e^{2\pi j v_1}, \ldots, e^{2\pi j v_F}]$ and $[e^{2\pi j \mu_1}, \ldots, e^{2\pi j \mu_F}]$
We will present an MLE for complex frequency extraction
Recall that the integers: $K_1, K_2, L_1, L_2$ are required to satisfy:

$$K_1 L_1 \geq F, K_2 L_2 \geq F$$

with $$K_1 + K_2 = K + 1$$

$$L_1 + L_2 = L + 1$$

When noise is present in the signal (and thus in the data matrix X), a new data matrix X' that includes the noise is defined as: X'=X+noise, where Noise is a complex Gaussian noise.

Accordingly, the implementation of the MDF process is defined in the following four steps, executed by one or more processors:

1. Form $\tilde{X}'$ and $\tilde{Y}'$ from X'. The integers $K_1, K_2, L_1$ and $L_2$ should satisfy $$K_1 L_1 \geq F, K_2 L_2 \geq F \text{ with}$$

$$K_1 K_2 = K + 1$$

$$L_1 + L_2 = L + 1$$

2. Compute the F principal left singular vectors (U') of $[\tilde{X}'^T \tilde{Y}'^T]^T$. Partition U' into two equal-sized matrices: $U'_1$ and $U'_2$ 3. Compute the eigenvectors of $U_1'^\dagger U_2'$, which is: $(T')^{-1}$ to obtain:

$$(GC)' = U'_1 (T')^{-1}$$

$$H' = [(GC)'^\dagger \tilde{X}']^T$$

$$(G\tilde{C})' = U'_2 (T')^{-1}$$

$H'' = [(G\tilde{C})^+ \tilde{Y}']^T$

4. Extract frequencies and decay coefficients from G'C', and H'. Each column of G'C', and H' is a tensor product of a complex frequency steering vector. Form a maximum likelihood estimate of complex frequencies of each column of G'C', and H' and average.

5. Separate from non-dispersive scatterers from magnitude of decaying factor: $e^{\alpha_1}$, $e^{\alpha_2}$ It is noted that for applications of dispersive scatterer removal, H" and $(G\tilde{G})'$ (derived from the backward-matrix) are not exploited. The maximum likelihood estimate of complex azimuth-Doppler frequency is derived as follows, $y_{m,n} = z e^{\alpha_1 m} e^{j2\pi n Tf_1} e^{\alpha_2 n} e^{j2\pi n Tf_2} + w_{m,n}$; $m = 0, 1, \ldots, M-1$; $n = 0, 1, \ldots, N-1$; $z = ae^{j\phi}$ $w_{m,n}$ complex white gaussian noise; $E\{|w_{m,n}|^2\} = \sigma^2$ $\mu_1 = \alpha_1 + 2\pi i f_1$; $\mu_2 = \alpha_2 + 2\pi i f_2$: complex frequencies $\vec{y} = z \vec{e}_M(\mu_1) \otimes \vec{e}_N(\mu_2) + \vec{w}$;

$\vec{e}(\mu_1, \mu_2) = \vec{e}_M(\mu_1) \otimes \vec{e}_N(\mu_2)$; tensor product of $\vec{e}_M(\mu_1)$ and $\vec{e}_N(\mu_2)$ $\vec{e}_N(\mu) = [1 \ldots e^{\mu n} \ldots e^{\mu(N-1)}]^T$;

$\vec{y} = [y_{0,0} \ldots y_{0,n} \ldots y_{M-1,N-1}]^T$;

One can determine the maximum likelihood for the unknown complex frequencies: $\mu_1$ and $\mu_2$ from —Log—Likelihood is:

$$\Lambda(\hat{\mu}_1, \hat{\mu}_2) = -\frac{1}{\sigma^2} \frac{\vec{e}(\hat{\mu}_1, \hat{\mu}_2)^* \vec{y}}{\|\vec{e}(\alpha_1)\|^2 \|\vec{e}(\alpha_1)\|^2} \vec{y}^* \vec{e}(\hat{\mu}_1, \hat{\mu}_2) = -\frac{1}{\sigma^2} \frac{|\vec{y}^* \vec{e}(\hat{\mu}_1, \hat{\mu}_2)|^2}{\|\vec{e}(\alpha_1)\|^2 \|\vec{e}(\alpha_1)\|^2}$$

$$MLE \Leftrightarrow \min_{\hat{\mu}_1, \hat{\mu}_2} \{\Lambda(\hat{\mu}_1, \hat{\mu}_2)\} \Leftrightarrow \max_{\hat{\mu}_1, \hat{\mu}_2} \left\{ \frac{|\vec{y}^* \vec{e}(\hat{\mu}_1, \hat{\mu}_2)|^2}{\|\vec{e}(\alpha_1)\|^2 \|\vec{e}(\alpha_1)\|^2} \right\}$$

Then the one or more processors determine that the corresponding scatterer is dispersive clutter-like return, when the magnitude of $\alpha_1$ or $\alpha_2$ is greater than a certain threshold, for example 0.01. Otherwise that the corresponding scatterer is deemed a non-dispersive target-like scatterer. Finally, the dispersive (clutter) component is deleted from the radar return signal to obtain a cleansed radar return signal.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A computer implemented method for discrimination and identification of a target, the method comprising:
   receiving a radar return signal including target information and clutter information, by a radar receiver;
   determining, by a processor, a two-fold forward or forward-backward data matrix from the received signal, using a multi-dimensional folding (MDF) process;
   computing, by the processor, singular values of the two-fold forward or forward-backward data matrix;
   using the computed singular values, by the processor, to determine a noise power level of the radar return signal;
   determining, by the processor, the number of scatterers in the radar return signal according to a predetermined threshold value above the noise power;
   estimating, by the processor, Doppler and azimuth frequencies of each scatterer from the determined number of scatterers using the MDF process;
   determining, by the processor, dispersive scatterers and non-dispersive scatterers using the estimated Doppler and azimuth complex frequencies of each scatterer; and
   distinguishing, by the processor, the target information from the clutter information, according to the determined dispersive scatterers and non-dispersive scatterers.

2. The method of claim 1, wherein an average power of middle third of the square of the computed singular values is used to estimate the noise power level of the radar return signal.

3. The method of claim 1, wherein said determining the number of scatterers comprises keeping scatterers with corresponding value of 12 dB above the noise power level, and disregarding the scatterers with corresponding value below 12 dB value.

4. The method of claim 1, wherein the predetermined threshold value is dynamically changed depending on the environmental and weather conditions.

5. The method of claim 1, wherein the dispersive scatterers and non-dispersive scatterers are determined by using a maximum likelihood for dispersion/non-dispersion in two dimensions.

6. The method of claim 1, wherein a dispersive scatterer is considered as a clutter or interference and a non-dispersive scatterer is considered as the target.

7. The method of claim 1, further comprising deleting the dispersive scatterers from the radar return signal to obtain a cleansed radar return signal.

8. The method of claim 1, wherein said determining a two-fold forward or forward-backward data matrix comprises determining a forward data matrix, determining a backward data matrix, and appending the forward data matrix to the backward data matrix.

9. The method of claim 1, wherein said determining dispersive scatterers and non-dispersive scatterers comprises estimating and pairing 2-D complex frequency components, and computing an envelope for the scatterers.

10. A system for discrimination and identification of a target comprising:
   a receiver for receiving a radar return signal including target information and clutter information;
   a storage medium for storing the radar return signal; and
   one or more processors configured to determine a two-fold forward or forward-backward data matrix from the received signal, using a multi-dimensional folding (MDF) process; compute singular values of the two-fold forward or forward-backward data matrix; using the computed singular values determine a noise power level of the radar return signal; determine the number of scatterers in the radar return signal according to a predetermined threshold value above the noise power; estimate Doppler and azimuth frequencies of each scatterer from the determined number of scatterers using the MDF process; determine dispersive scatterers and non-dispersive scatterers using the estimated Doppler and azimuth complex frequencies of each scatterer; and distinguish the target information from the clutter information, according to the determined dispersive scatterers and non-dispersive scatterers.

11. The system of claim 10, wherein said one or more processors are configured to utilize an average power of middle third of the square of the computed singular values to estimate the noise power level of the radar return signal.

12. The system of claim 10, wherein said determining the number of scatterers comprises keeping scatterers with corresponding value of 12 dB above the noise power level, and disregarding the scatterers with corresponding value below 12 dB value.

13. The system of claim 10, wherein said one or more processors are configured to dynamically change the predetermined threshold value depending on the environmental and weather conditions.

14. The system of claim 10, wherein said one or more processors are configured to determine the dispersive scatterers and non-dispersive scatterers by using a maximum likelihood for dispersion/non-dispersion in two dimensions.

15. The system of claim 10, wherein a dispersive scatterer is considered as a clutter or interference and a non-dispersive scatterer is considered as the target.

16. The system of claim 10, wherein said one or more processors are further configured to delete the dispersive scatterers from the radar return signal to obtain a cleansed radar return signal.

17. The system of claim 10, wherein said one or more processors are configured to determine said two-fold forward or forward-backward data matrix by determining a forward data matrix, determining a backward data matrix, and appending the forward data matrix to the backward data matrix.

18. The system of claim 10, wherein said one or more processors are configured to determine said dispersive scatterers and non-dispersive scatterers by estimating and pairing 2-D complex frequency components, and computing an envelope for the scatterers.

\* \* \* \* \*